United States Patent [19]

Kyriakides

[11] Patent Number: 4,758,732
[45] Date of Patent: Jul. 19, 1988

[54] DATA SHEET SUPPORT WITH SCANNER GUIDE AND MANUAL FEED

[76] Inventor: Anastasios N. Kyriakides, 1620 SW. 96 Ave., Miami, Fla. 33165

[21] Appl. No.: 33,478

[22] Filed: Apr. 2, 1987

[51] Int. Cl.$^4$ .............................. G06K 7/10
[52] U.S. Cl. ............................. 250/566; 235/472; 235/482
[58] Field of Search ............. 235/472, 482, 483; 400/73; 250/568, 569, 570, 571, 557

[56] References Cited

U.S. PATENT DOCUMENTS

| | | | |
|---|---|---|---|
| 3,693,019 | 9/1972 | Grenda et al. | 250/569 |
| 4,260,880 | 4/1981 | Thomas | 250/566 |
| 4,575,703 | 3/1986 | Shishido | 235/482 |
| 4,687,352 | 8/1987 | Igi et al. | 400/73 |

*Primary Examiner*—David C. Nelms
*Assistant Examiner*—J. L. Ruoff
*Attorney, Agent, or Firm*—Cushman, Darby & Cushman

[57] ABSTRACT

An apparatus for scanning a sheet of printed material including a top frame element having a rail thereon for guiding the movement of a hand held optical character reader. A sheet of paper is inserted between a top frame element and a bottom frame element which is spaced therefrom. A window having tapered edges is provided in the top frame element through which an operator can insert a finger or thumb to advance the paper in a path transverse to the direction of movement of the optical character reader. In this way, the path of traverse of the optical character reader will not become misaligned with the printed lines on the sheet.

3 Claims, 1 Drawing Sheet

U.S. Patent   Jul. 19, 1988   4,758,732

DATA SHEET SUPPORT WITH SCANNER GUIDE AND MANUAL FEED

BACKGROUND OF THE INVENTION

1. Field of the Invention

The present invention relates to the field of optical character readers, which are used to electronically recognize printed characters. Specifically, the present invention relates to a method and apparatus for feeding a paper sheet or the like past an optical character reader.

2. Description of the Prior Art

Optical character readers are commonly used for such purposes as loading text from printed sheets into word processing and retrieval systems or the like.

The common optical character reader (OCR) operates by scanning the region on a sheet of paper or the like on which a character is printed. Usually, the image of the character and the surrounding space on the paper is focused by means of a lens onto an array of photoelectric transducers. In this way, a microprocessor inside the OCR can recognize the character by comparing the light and dark portions of the scanned area with a reference matrix that is stored in a memory chip in the OCR.

Since each character must be individually scanned and recognized by the OCR, the OCR must be physically repositioned along the line of print each time a character is to be read. Such positioning has proved to be a problem though, since most OCRs are unable to recognize a character if they are inclined, even a slight amount, with respect to the line of print that is to be scanned. Since the scanning is usually performed manually, efficient scanning has in the past required an inordinate amount of patience and skill on the part of the operator. Clearly, there exists a long and unfilled need in the prior art for an inexpensive device for use in aiding an OCR operator to scan a printed page without missing any characters.

SUMMARY OF THE INVENTION

The present invention relates to an apparatus for scanning a sheet of printed material having a frame with a rail thereon extending from one side of the frame to the other for supporting an optical character reader for sliding movement therealong. The frame has a transparent surface overlaying a sheet of printed material which is to be scanned. Also provided on the upper section of the frame means is a small window through which an operator can insert his finger or thumb to move the paper along the frame member. The edge of the frame which defines the window is tapered outwardly from the paper to facilitate use of a thumb or finger to push the paper along. The frame can be made portable, or can be secured to a support member that is positioned proximate an OCR scanning station.

Other objects, features, and characteristics of the present invention, as well as the methods in operation in functions of the related elements of the structure, and to the combination of parts and economies of manufacture, will become apparent upon consideration of the following description in the appended claims with reference to the accompanying drawings, all of which form a part of this specification, wherein like reference numerals designate corresponding part in the various figures.

DETAILED DESCRIPTION OF THE PREFERRED EMBODIMENT

Figure 1:
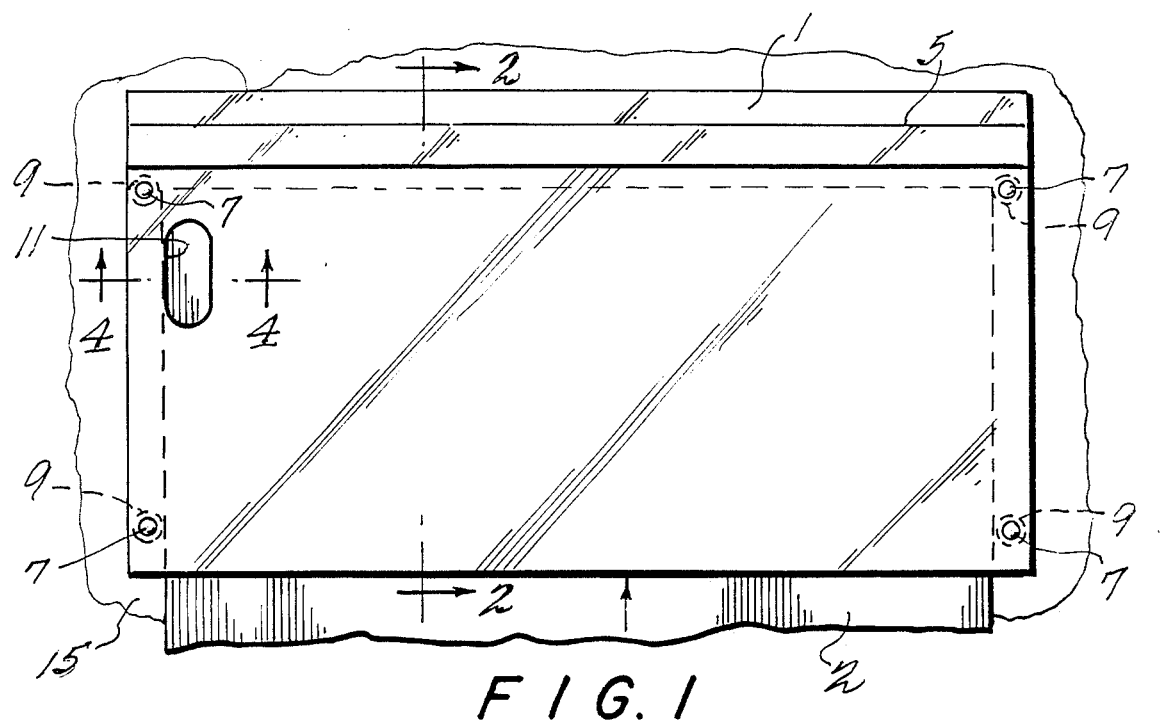
FIG. 1 shows a top plan view of the top frame element of the present invention.
Figure 3:
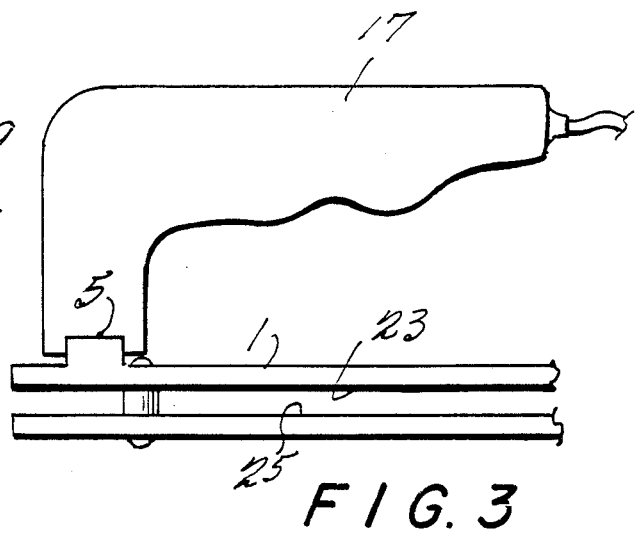
FIG. 3 is a side view of an optical character reader engaging the rail that is provided on the top frame element.

As shown in FIG. 1, a top frame element 1 is provided with a rail member 5 for supporting and guiding an optical character reader 17 for sliding movement therealong, as is shown in FIG. 3. Both top frame element 1 and rail member 5 are preferably made of a transparent material, such as a hard clear acrylic, so that a sheet of paper may be viewed therethrough.

Figure 2:
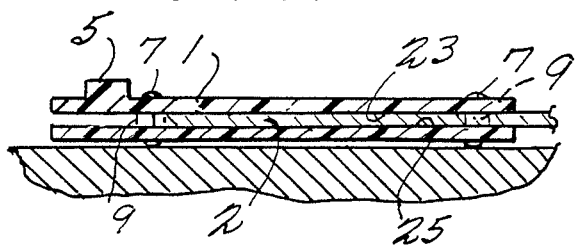
FIG. 2 shows a cross sectional side view taken along line 2—2 of FIG. 1.

As shown in FIG. 2, a sheet of paper may be guided between the top frame element 1 and a bottom frame element 3, which is spaced so as to be slightly apart from the top frame element 1. The top frame element 1 and the bottom frame element 3 are provided with inner guide surfaces 23, 25, respectively, which are made smooth to guide paper sheets placed therebetween. Preferably, the spacing between the paper and the two inner guide surfaces is made small so as to prevent unwanted shifting of the paper with respect to the optical character reader.

Figure 4:
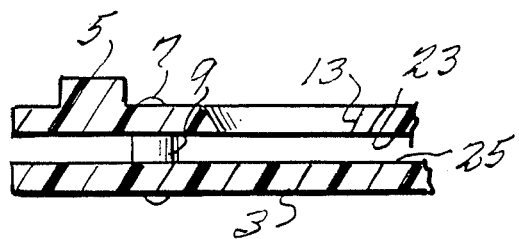
FIG. 4 is a cross section taken along lines 4—4 in FIG. 1.

An opening 11 defines a window in the top frame element, as is shown in FIG. 1. As seen in FIG. 4, the opening 11 is bounded by a tapered edge 13 which tapers outwardly from the guide surface of the top frame element to its outward surface, to facilitate the insertion of a human digit such as a finger or thumb to push the paper along between the top frame element and the bottom frame element. Thus the elongated opening 11 allows an operator to advance the paper with respect to rail member 5 when a new line of print on the paper is to be scanned by the OCR.

A pair of fastener members 7 are provided to secure the top frame element to the bottom frame element, as shown in FIG. 2. Spacer elements 9 are provided in alignment with fastener members 7 to maintain the proper spacing between top frame element 1 and bottom frame element 3. In the preferred embodiment, the entire assembly is secured to a support member 15, which is positioned in a convenient location nearby to an optical character reader. However, the entire assembly could be made portable by detaching the bottom frame element from the support member.

An advantage of the present invention is that it allows a piece of paper having printed lines thereon to be precisely aligned with respect to the path of traverse of an OCR, thereby promoting more efficient scanning. Since the guide surfaces of the top frame element and the bottom frame element are spaced closely to impart friction to the sheet of paper, it would ordinarily be difficult to advance the paper so as to precisely position the print lines with respect to rail member 5 simply by feeding the paper in from the bottom of the assembly. However, provision of the opening 11 allows the operator to accomplish just that by using his or her finger or thumb to advance the paper. The present invention thus provides a simple, inexpensive means for increasing the efficiency of manual OCR scanning.

While the invention has been described in connection with what is presently considered to be the most practical and preferred embodiment, it is to be understood that the invention is not limited to the disclosed embodiment, but, on the contrary, is intended to cover various modifications in equivalent arrangements included within the spirit and scope of the appended claims. For example, the entire top frame element 1 needs not be fabricated from a transparent material, only the rail portion 5.

What is claimed:

1. An apparatus for scanning a sheet of printed material comprising:
   top frame means having a transparent rail portion thereon for guiding a scanner and a smooth inner surface for guiding a sheet of paper or the like, said top frame element means defining an opening for permitting a human digit to pass therethrough; and
   bottom frame means having a guide surface;
   means for connecting said top frame means and bottom frame means in parallel fixed spaced apart relation from said top frame means so that a sheet of paper having print thereon to be scanned may be advanced past said transparent rail portion by the finger or thumb of an operator.

2. An apparatus according to claim 1, wherein said opening is oval with upper and lower edge regions thereof tapered outwardly in the direction from top to bottom to better facilitate insertion of a finger or thumb.

3. An apparatus as in claim 2 wherein said opening is elongated in a direction transparent to the direction in which said rail extends.

* * * * *